US011449851B1

(12) United States Patent
Spector

(10) Patent No.: US 11,449,851 B1
(45) Date of Patent: Sep. 20, 2022

(54) SYSTEMS AND METHODS FOR PROVIDING EMBEDDED BANKING SERVICES

(71) Applicant: JPMorgan Chase Bank, N.A., New York, NY (US)

(72) Inventor: Howard Spector, Woolwich, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 431 days.

(21) Appl. No.: 15/585,992

(22) Filed: May 3, 2017

Related U.S. Application Data

(60) Provisional application No. 62/331,564, filed on May 4, 2016.

(51) Int. Cl.
*G06Q 20/32* (2012.01)
*G06Q 20/38* (2012.01)

(52) U.S. Cl.
CPC ..... *G06Q 20/3223* (2013.01); *G06Q 20/3227* (2013.01); *G06Q 20/3829* (2013.01); *G06Q 2220/00* (2013.01)

(58) Field of Classification Search
CPC ........... G06Q 20/3223; G06Q 20/3227; G06Q 20/3829; G06Q 2220/00
See application file for complete search history.

(56) References Cited

U.S. PATENT DOCUMENTS

| 8,751,393 B1* | 6/2014 | Murray | G06Q 40/02 |
| | | | 705/42 |
| 2011/0196782 A1* | 8/2011 | Allen | G06Q 20/10 |
| | | | 705/39 |
| 2014/0280517 A1* | 9/2014 | White | H04L 67/04 |
| | | | 709/203 |
| 2016/0162883 A1* | 6/2016 | Liscia | G06K 19/06206 |
| | | | 705/71 |
| 2017/0289185 A1* | 10/2017 | Mandyam | H04L 63/0245 |

OTHER PUBLICATIONS

Apple Inc., iOS Technology Overview, Sep. 17, 2014 (Year: 2014).*

* cited by examiner

*Primary Examiner* — John W Hayes
*Assistant Examiner* — Ari Shahabi
(74) *Attorney, Agent, or Firm* — Greenberg Traurig LLP

(57) ABSTRACT

Systems and methods for providing embedded banking services are disclosed. In one embodiment, a method for providing embedded banking services on an electronic device may include (1) a computer program executed by an electronic device comprising a computer processor generating a request to enable embedded banking services for a financial institution on the electronic device; (2) the computer program communicating the request to a host for the electronic device; (3) the computer program receiving a secure token and an encryption key from one of the host of the electronic device and the financial institution; (4) the computer program storing the secure token and encryption key in secure storage of the electronic device; and (5) the computer program enabling embedded banking services on the electronic device.

16 Claims, 5 Drawing Sheets

SYSTEMS AND METHODS FOR PROVIDING EMBEDDED BANKING SERVICES

RELATED APPLICATIONS

This application claims priority to U.S. Provisional Patent Application Ser. No. 62/331,564, filed May 4, 2016, the disclosure of which is hereby incorporated, by reference, in its entirety.

BACKGROUND OF THE INVENTION

1. Field of the Invention

The present disclosure generally relates to systems and methods for providing embedded banking services.

2. Description of the Related Art

With the onset of mobile electronic devices, a number of third parties have introduced electronic wallets for conducting transactions. These electronic wallets generally store credit card information for a customer so that the customer can use that information to conduct a transaction. Often, the credit card issuer has little or no control over the third party electronic wallet.

SUMMARY OF THE INVENTION

Systems and methods for providing embedded banking services are disclosed. In one embodiment, a method for providing embedded banking services on an electronic device may include (1) a computer program executed by an electronic device comprising a computer processor generating a request to enable embedded banking services for a financial institution on the electronic device; (2) the computer program communicating the request to a host for the electronic device; (3) the computer program receiving a secure token and an encryption key from one of the host of the electronic device and the financial institution; (4) the computer program storing the secure token and encryption key in secure storage of the electronic device; and (5) the computer program enabling embedded banking services on the electronic device.

In one embodiment, the method may also include the computer program receiving a user request to enable embedded banking services. The user request may be received at a settings menu for the computer program.

In one embodiment, the computer program may be an operating system for the electronic device, a mobile banking application, etc.

In one embodiment, the host may be a manufacturer of the electronic device, a developer of the operating system, etc.

In one embodiment, the secure storage may be a secure element on the electronic device, secure cloud storage, etc.

In one embodiment, the method may further include the computer program requesting at least an identification of an endpoint and a supported service from the financial institution; and the computer program receiving at least one of the identification of the endpoint and the supported service from the financial institution.

In one embodiment, enabling embedded banking services may enable an operating system service.

In one embodiment, the embedded banking service may be a person-to-person baking service.

According to another embodiment, a method for implementing embedded banking services on an electronic device may include (1) a computer program executed by an electronic device comprising a computer processor identifying one of a message and an event related to a financial transaction in an application executed by the electronic device; (2) the computer program presenting an option to conduct the financial transaction within the application; (3) the computer program presenting the financial transaction to a financial institution; and (4) the computer program receiving a report for the financial transaction from the financial institution.

In one embodiment, the computer program may be an operating system for the electronic device, a mobile banking application, etc. The mobile banking application may be an e-commerce application.

In one embodiment, the option to conduct the financial transaction may be presented as a banner within the application, as an icon within the application, etc.

In one embodiment, the method may also include the computer program receiving an authentication request from the financial institution; the computer program receiving authentication information from a user of the electronic device; and the computer program providing the authentication information to the financial institution.

In one embodiment, the computer program may encrypt the financial transaction before presenting the financial transaction to the financial institution.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for providing embedded banking services. In embodiments, embedded banking services may place a customer's banking relationship on a mobile electronic device and may work with or without an issuer's application being installed on that device.

Examples of such supported banking services may include person-to-person (P2P) services (e.g., activity detail, enroll, payment, recipient, reference, settings, cancel, etc.), authentication services (e.g., different levels of authentication), acquisitions, third party bill payment, account payments, other (e.g., get token, get reward information, dispute transaction, submit question, etc.). Other services may be supported as necessary and/or desired.

In one embodiment, the products and/or services may be generalized so as to be applicable to more than one financial institution.

The consumer's identity may be stored in, for example, a secure element of a mobile electronic device. The customer's identity may be tied to, or associated with, the mobile electronic device, whereby one or more financial institutions may provide banking service on the mobile electronic device at the operating system (OS) level.

Once supported banking services are enabled, the mobile electronic device may use the location of the issuer's end points that the device must access to perform financial transactions from, for example, a common directory service. The directory service may be common to a plurality of issuers, and may be maintained by an issuer, a group of issuers, a third party, etc.

The issuer end point may offer financial services in a common format that allows the device to generically access the data. Each end point may also expose an "available services" API that may provide back a list of services that are supported by the issuer.

Figure 1:
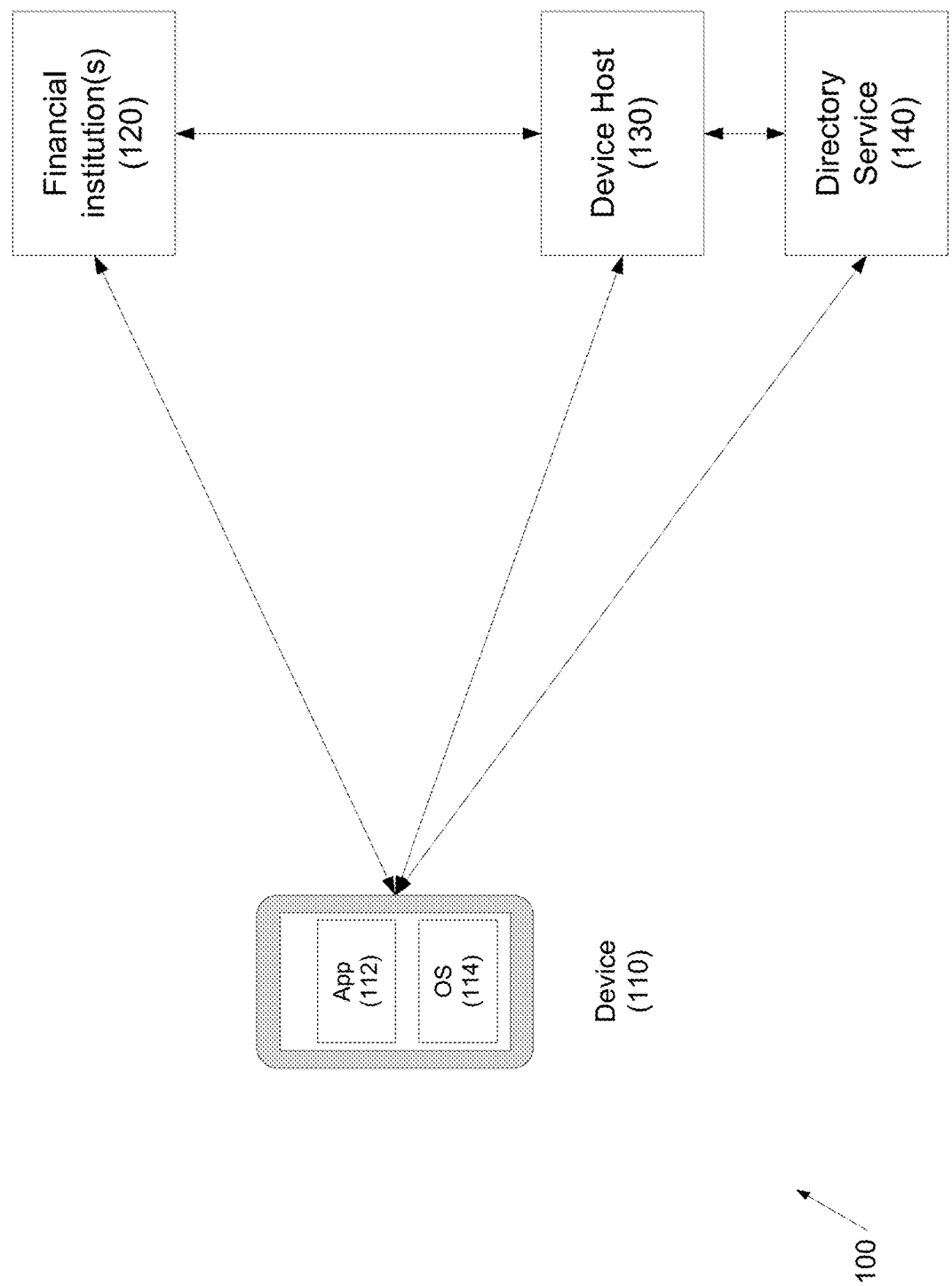
FIG. 1 depicts a system for providing embedded banking services according to one embodiment.

Referring to FIG. 1, a system for providing embedded banking services is disclosed according to one embodiment. System 100 may include electronic device 110, one or more financial institution 120, and device host 130. In one embodiment, electronic device may be any suitable electronic device that may facilitate a payment, store an electronic wallet, etc. For example, electronic device 110 may be a mobile electronic device such as a smartphone, tablet computer, notebook computer, etc.; a desktop computer, workstation, an Internet of Things (IOT) appliance, etc.

In one embodiment, electronic device 110 may host app 112, such as an electronic wallet for which financial instruments may be provisioned. Electronic device 110 may also execute other applications or computer programs, such as a payment application, an application provided by financial institution 120, etc.

In one embodiment, electronic device 110 may run operating system 114, such as Apple's iOS, Google's Android, Microsoft's Windows, etc. In one embodiment, electronic device 110 may include secure storage, such as the secure element in the iPhone. Other examples of secure storage include secure storage in electronic device 110's memory, secure cloud storage, etc.

Device host 130 may provide electronic device 110 and/or the operating system that runs on electronic device 110. In one embodiment, device host 130 may be the manufacturer of electronic device 110, the provider of electronic device 110, and/or the developer/provider of operating system 114 for electronic device 110.

In one embodiment, financial institution 120 may be an issuer of a financial instrument, such as a credit card, to a user. In one embodiment, the financial instrument may be provisioned for an electronic wallet executed by electronic device 110.

In one embodiment, financial institution 120 and device host 130 may communicate directly.

In one embodiment, directory service 140 may be provided. In one embodiment, directory service 140 may support a plurality of financial institutions and may be accessed by device host 130. In one embodiment, directory service 140 may return the services supported by financial institutions. Examples of such supported services may include person-to-person (P2P) services (e.g., activity detail, enroll, payment, recipient, reference, settings, cancel, etc.), authentication services (e.g., different levels of authentication), acquisitions, third party bill payment, account payments, other (e.g., get token, get reward information, dispute transaction, submit question, etc.). Other services may be supported as necessary and/or desired.

In one embodiment, the products and/or services may be generalized so as to be applicable to more than one financial institution, and may change as additional services are added.

In one embodiment, device 110, or an application executed by device 110, may communicate with directory service 140 as necessary and/or desired.

Figure 2:
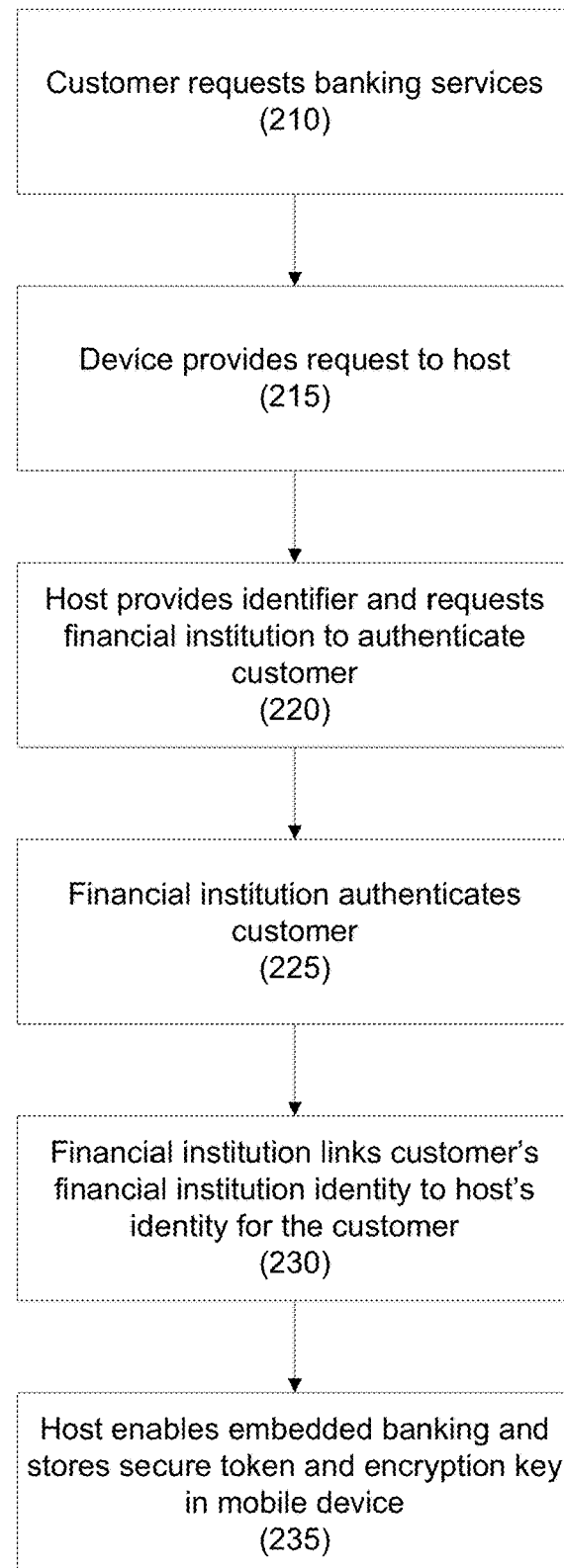
FIG. 2 depicts a method for unified banking according to one embodiment.

Referring now to FIG. 2, a method for enabling embedded banking is disclosed according to one embodiment. In step 210, the customer may enable embedded banking services on his or her electronic device. In one embodiment, embedded banking services may be enabled during new device setup, or at any time via, for example, a settings menu.

In step 215, the electronic device may generate and provide a request for embedded banking services to a device host, such as the electronic device manufacturer, the electronic device provider, the operating system developer/provider, etc. In one embodiment, the operating system may facilitate this request.

In step 220, the electronic device host may provide a unique identifier to the electronic device and/or operating system, and may request customer authentication from the financial institution with which the customer is seeking to enable embedded banking services with.

In step 225, the financial institution may authenticate the customer in any suitable manner, including, for example, multifactor authentication, out of band authentication, out of wallet authentication, one time passcode validation, biometric authentication, username/password entry, combinations thereof, etc., using the customer contact information that may already be registered with the financial institution. In one embodiment, any suitable authentication method may be used as is necessary and/or desired.

In step 230, once authenticated, the financial institution may link the customer's financial institution identity to the electronic device host's (e.g., the electronic device maker, electronic device provider, operating system provider, etc.) identity for the customer. For example, the financial institution may associate the user's host account information with the user's financial account information. This association may be stored, for example, in a table. In still another embodiment, the electronic device host may perform this association.

In another embodiment, the financial institution and the electronic device host may exchange authentication tokens.

In step 235, the electronic device host may enable embedded banking services and may store a secure banking token and encryption key to enable banking services in, for example, a secure element or other secure storage in the electronic device, in cloud secure storage, etc.

After enablement, the electronic device may contain encryption keys, a token, and/or other data that is necessary and/or desired to secure future communication with the financial institution. This communication may occur at several levels based on, for example, risk associated with the transaction. For example, for low-risk transactions, the encryption data stored in the secure element may be used to perform transactions with no additional password. For higher-risk transactions, there may be one or more "step up" authentication levels that the customer must pass to perform more risky transactions.

Figure 3:
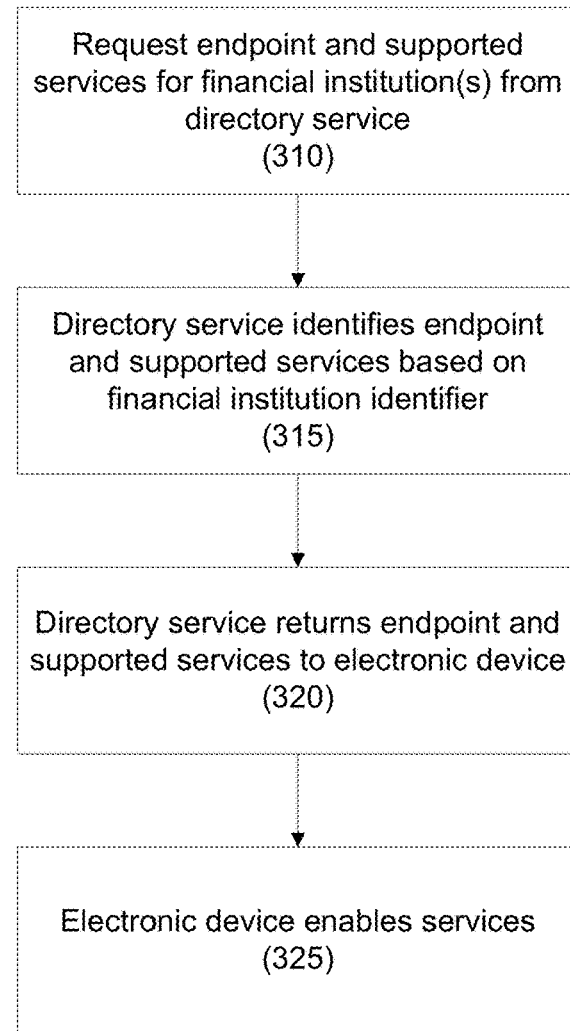
FIG. 3 depicts a method for using embedded banking with a directory service according to one embodiment.

Referring to FIG. 3, a method for using embedded banking with a directory service is disclosed according to one embodiment. In step 310, an application or operating system executed by an electronic device may request end point and supported services information for one or more of a customer's financial institutions from a directory service. Any other information may be requested as is necessary and/or desired. As discussed above, in one embodiment, the directory service may support a plurality of financial institutions.

In one embodiment, the request may be made via a device host, such as the device manufacturer, supplier, or operating system supplier.

In one embodiment, an identifier for a financial institution may be provided. For example, the account number may include a bank routing number, a bank identification number, etc. In another embodiment, the electronic device may provide a financial institution identifier, a partner identifier, etc. In another embodiment, the user may identify the relevant financial institution(s) to the operating system and/or application. In still another embodiment, the electronic device may provide a shared secret from, for example, the financial institution, with the directory service. Any other suitable manner of identifying the financial institution(s) may be used as is necessary and/or desired.

In step 315, the directory service may identify the end point, supported services, and any other information that may be requested or is otherwise necessary. In one embodiment, this may include performing a table look-up to identify the end point, supported services, and other information.

In step 320, the directory service may return end point, supported services, and any other information requested.

In step 325, the operating system for the electronic device may enable the supported services. In one embodiment, the electronic device and/or operating system may enable all supported services. In another embodiment, the user may identify which supported services it would like to enable or disable.

In one embodiment, the Android operating system may enable the intent service for monitoring activity (e.g., messages, emails, web interactions, etc.) for banking services. The iOS operating system may use App Extensions.

Figure 4:
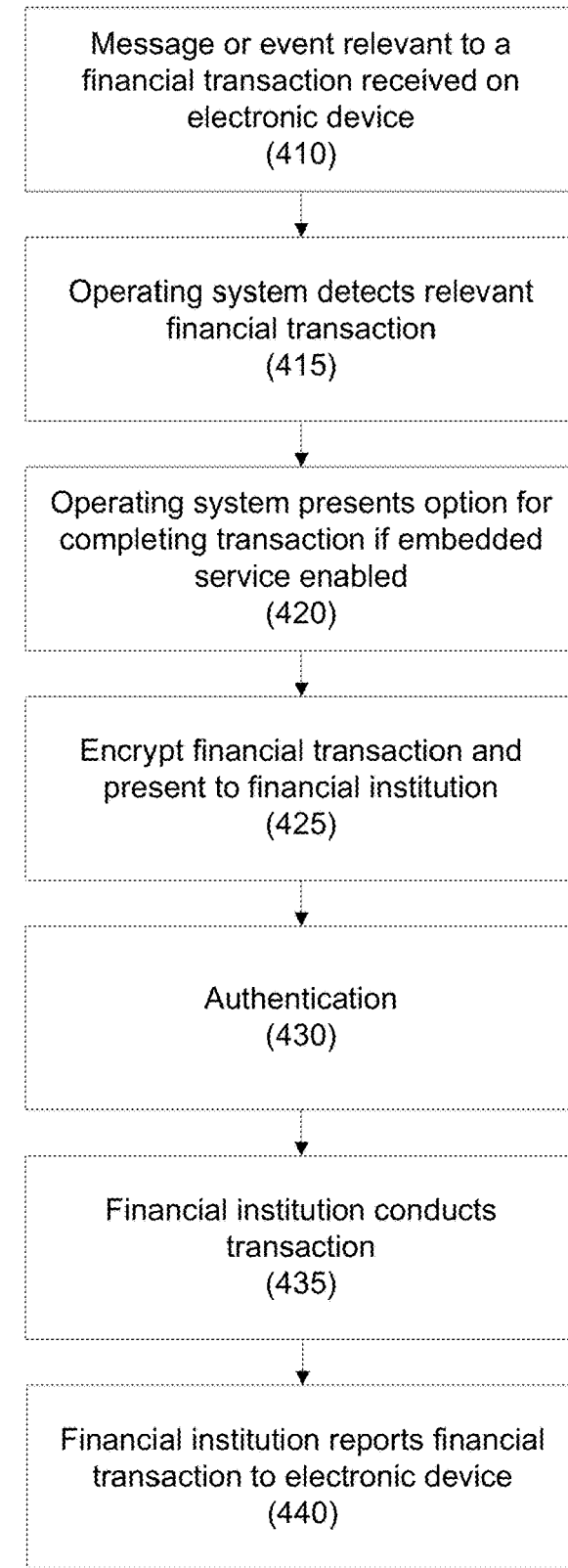
FIG. 4 depicts an exemplary embedded banking process flow according to one embodiment.

Referring to FIG. 4, an exemplary usage process flow is provided.

In step 410, a user may receive a message or messages, be involved in a communication (e.g., a telephone call), or be involved in an event that may indicate or suggest a financial transaction. For example, the first message may be "How much do I owe you" and the response may be "$9." In another embodiment, the user may discuss a financial transaction in a telephone call. In another embodiment, the user may perform on-line shopping. Any other suitable message, communication, or event may be performed as is necessary and/or desired.

In step 415, the operating system and/or application may detect a relevant financial transaction in the message, communication, or event. For example, text recognition, voice recognition, national language processing, etc. may be used.

In one embodiment, the intent service may be used in Android operating system devices; App Extensions may be used in iOS devices.

In step 420, if the appropriate embedded banking service is enabled, the operating system may present an option for completing the financial transaction. For example, an bank icon, a money icon, a banner message, etc. may be presented that may launch a relevant mobile application for the financial institution, or it may initiate the financial transaction from within the operating system.

In step 425, the operating system may encrypt a financial transaction request and may communicate the financial transaction request to the financial institution.

In one embodiment, the operating system may encrypt the financial transaction request and provided it to the host, which may then provide the financial transaction request to the financial institution.

In step 430, additional authentication may be requested by the financial institution. In one embodiment, the user may be authenticated directly to the financial intuition through, for example, out-of-band authentication, etc. In one embodiment, the electronic device may use an API provided by the financial institution to authenticate the user.

In one embodiment, the operating system may provide authentication information (e.g., one or more tokens, etc.) to the financial institution to authenticate the user.

In step 435, the financial institution may conduct the financial transaction. In one embodiment, the financial institution may annotate the transaction as being an embedded banking service transaction.

In step 440, the financial institution may report the transaction to the electronic device. In one embodiment, the transaction may be stored in an application, mobile wallet, etc.

Figure 5:
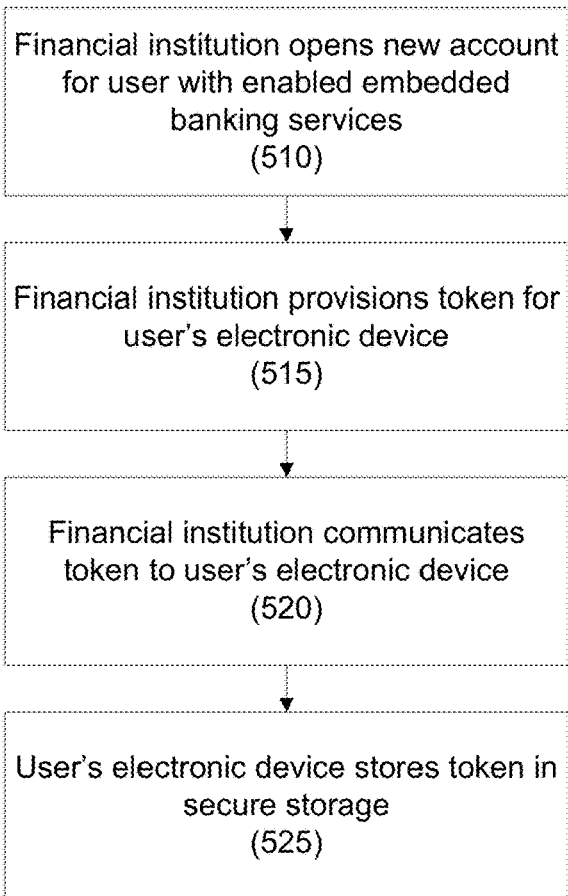
FIG. 5 depicts a method of token provisioning according to one embodiment.

Referring to FIG. 5, a method for automatically provisioning a user's financial instruments to the operating system with embedded banking services enabled, or an electronic wallet (Apple Pay, Samsung Pay or similar) executed by an electronic device is disclosed according to one embodiment. In one embodiment, all of the user's financial instruments or products may be added to the user's electronic wallet without the customer having to request provisioning. In one embodiment, the provisioning may be for new financial instruments (e.g., new credit cards), for replacement financial instruments (e.g., compromised financial instruments, expired financial instruments), etc.

In step 510, a financial institution may identify that a new token is to be provisioned for a user having enabled embedded banking services on his or her electronic device. As noted above, this may be for a new financial instrument, a replacement financial instrument, etc.

In step 515, the financial institution may provision a token for the user's electronic device.

In step 520, the financial institution may communicate the token to the user's electronic device. In one embodiment, the token may be communicated to an application or computer program (e.g., mobile wallet, financial institution app, etc.) that may be executed by the user's electronic device. In another embodiment, the token may be communicated to the electronic device's operating system.

In step 525, the user's electronic device may store the token. In one embodiment, the token may be stored in a secure element of the electronic device. Any secure storage, including secure cloud storage, may be used as is necessary and/or desired.

Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method performed by an electronic device comprising at least one computer processor, comprising:
    generating, by an electronic device, a request to enable a plurality of embedded banking services for a financial institution at an operating system level in an operating system executed by the electronic device;
    communicating, by the electronic device, the request to a host for the electronic device;
    receiving, by the electronic device and from the host of the electronic device or a computer for the financial institution, a banking token and an encryption key;
    storing, by the electronic device, the banking token and encryption key in a secure storage element of the electronic device;
    enabling, by the electronic device, the plurality of embedded banking services in the operating system of the electronic device in response to the secure banking token and the encryption key being stored in secure storage of the electronic device, wherein the operation system is configured to access a plurality of end points, wherein each end point exposes one of the plurality of embedded banking services to the operating system; and
    communicating, by the electronic device and by using one of the plurality of endpoints, the banking token and a financial transaction request that is encrypted with the encryption key to the computer for the financial institution.

2. The method performed by the electronic device of claim 1, wherein the user request is received at a settings menu for the operating system of the electronic device.

3. The method performed by the electronic device of claim 1, wherein the host is one of a manufacturer of the electronic device and a developer of the operating system.

4. The method performed by the electronic device of claim 1, wherein the secure storage is at least one of a secure element on the electronic device and secure cloud storage.

5. The method performed by the electronic device of claim 1, wherein the operating system is configured to request an identification of the plurality of end points from the financial institution; and receive the identification of the plurality of end points from the financial institution.

6. The method performed by the electronic device of claim 1, wherein one of the plurality of embedded banking services is a person-to-person banking service.

7. The method of claim 1, wherein one of the plurality of embedded banking services comprises person-to-person payments.

8. The method of claim 1, wherein one of the plurality of embedded banking services comprises authentication services.

9. The method of claim 1, wherein one of the plurality of embedded banking services comprises bill payment services.

10. The method of claim 1, further comprising:
    retrieving the plurality of end points from a directory service.

11. The method of claim 1, wherein the plurality of end points are specific to the financial institution.

12. The method of claim 1, wherein the plurality of end points are generic to a plurality of financial institutions.

13. The method of claim 1, wherein the operating system is configured to monitor activity on the electronic device to identify an activity involving one of the plurality of embedded banking services and to access a corresponding endpoint for the identified embedded banking service.

14. The method of claim 1, further comprising:
   identifying a financial transaction in a service that is part of the operating system; and
   presenting one of the plurality of embedded banking services to complete the financial transaction.

15. The method of claim 14, wherein the service is a messaging service.

16. The method of claim 14, wherein the financial transaction is in communication to or from the electronic device.

\* \* \* \* \*